United States Patent
Briese et al.

(10) Patent No.: US 10,809,108 B2
(45) Date of Patent: Oct. 20, 2020

(54) SENSOR FOR DETERMINING AT LEAST ONE PARAMETER OF A FLUID MEDIUM FLOWING THROUGH A MEASUREMENT CHANNEL

(71) Applicant: Robert Bosch GmbH, Stuttgart (DE)

(72) Inventors: Achim Briese, Palo Alto, CA (US); Alexander Markov, Stuttgart (DE); Axel-Werner Haag, Stuttgart (DE); Edda Sommer, Stuttgart (DE); Hans Beyrich, Freiberg/N. (DE); Uwe Konzelmann, Asperg (DE); Bastian Bodenberger, Stuttgart (DE); Frank Steuber, Leonberg (DE); Gerhard Hueftle, Aspach (DE); Holger Unger, Remseck (DE); Michael Rittmann, Ditzingen (DE); Michael Eppler, Ostfildern (DE); Reinhold Herrmann, Stuttgart (DE); Thomas Schwartzkopff, Ditzingen (DE)

(73) Assignee: Robert Bosch GmbH, Stuttgart (DE)

( * ) Notice: Subject to any disclaimer, the term of this patent is extended or adjusted under 35 U.S.C. 154(b) by 76 days.

(21) Appl. No.: 15/533,085

(22) PCT Filed: Oct. 6, 2015

(86) PCT No.: PCT/EP2015/073045
§ 371 (c)(1),
(2) Date: Jun. 5, 2017

(87) PCT Pub. No.: WO2016/091416
PCT Pub. Date: Jun. 16, 2016

(65) Prior Publication Data
US 2017/0328753 A1 Nov. 16, 2017

(30) Foreign Application Priority Data
Dec. 9, 2014 (DE) .................. 10 2014 225 303

(51) Int. Cl.
*G01F 1/684* (2006.01)
*G01F 5/00* (2006.01)
*G01M 15/04* (2006.01)

(52) U.S. Cl.
CPC .......... *G01F 1/6845* (2013.01); *G01F 1/6842* (2013.01); *G01F 5/00* (2013.01); *G01M 15/042* (2013.01)

(58) Field of Classification Search
CPC .................. G01F 1/684; G01F 5/00
(Continued)

(56) References Cited

U.S. PATENT DOCUMENTS

| 5,631,416 A | 5/1997 | Rilling et al. |
| 2012/0324990 A1* | 12/2012 | Briese ............ G01F 1/684 73/114.35 |

(Continued)

FOREIGN PATENT DOCUMENTS

| CN | 1262735 A | 8/2000 |
| DE | 19847303 A1 | 5/2000 |

OTHER PUBLICATIONS

International Search Report dated Dec. 14, 2015, of the corresponding International Application PCT/EP2015/073045 filed Oct. 6, 2015.

(Continued)

*Primary Examiner* — Eric S. McCall
(74) *Attorney, Agent, or Firm* — Norton Rose Fulbright US LLP; Gerard Messina

(57) ABSTRACT

A sensor is provided for determining at least one parameter of a fluid medium flowing through a measurement channel, in particular an intake air mass flow of an internal combustion engine. The sensor has a sensor housing, in particular a plug-in sensor that is inserted into or is insertable into a flow tube, in which sensor a measurement channel is fashioned, (Continued)

and has at least one sensor chip situated in the measurement channel for determining the parameter of the fluid medium. The sensor housing has an electronics compartment for accommodating an electronics module and has an electronics compartment cover for closing the electronics compartment. The electronics compartment cover has, at least in part, electrically conductive properties. For example, the electronics compartment cover is placed onto the electrical ground of the sensor and, viewed in projection, partly or completely covers the sensor chip.

11 Claims, 8 Drawing Sheets

(58) Field of Classification Search
USPC .............................. 73/114.32, 114.33, 114.34
See application file for complete search history.

(56) References Cited

U.S. PATENT DOCUMENTS

| | | | |
|---|---|---|---|
| 2013/0174654 A1* | 7/2013 | Schneider | G01F 1/00 |
| | | | 73/114.01 |
| 2013/0269419 A1 | 10/2013 | Etherington et al. | |
| 2013/0283895 A1* | 10/2013 | Etherington | G01F 1/6842 |
| | | | 73/114.34 |
| 2014/0224004 A1 | 8/2014 | Ariyoshi et al. | |
| 2015/0040653 A1* | 2/2015 | Konzelmann | G01F 1/69 |
| | | | 73/114.34 |

OTHER PUBLICATIONS

Konrad Reif (pub.): Sensoren im Kraftfahrzeug [Sensors in the Motor Vehicle], 1st edition 2010, pp. 146-148.

* cited by examiner

SENSOR FOR DETERMINING AT LEAST ONE PARAMETER OF A FLUID MEDIUM FLOWING THROUGH A MEASUREMENT CHANNEL

BACKGROUND INFORMATION

There are numerous, conventional methods and devices for determining a flow characteristic of fluid media, i.e. liquids and/or gases. The flow characteristics can be generally any physical and/or chemically measurable characteristics that qualify or quantify a flow of the fluid medium. In particular, this can be a flow speed and/or a mass flow and/or a volume flow.

Below, the present invention is described in particular with reference to so-called hot-film air mass sensors, as described for example in Konrad Reif (pub.): Sensoren im Kraftfahrzeug [Sensors in the Motor Vehicle], $1^{st}$ edition 2010, pp. 146-148. Such hot-film air mass sensors are generally based on a sensor chip, in particular a silicon sensor chip, having a sensor membrane as measurement surface or sensor area over which the flowing fluid medium can flow. Generally, the sensor chip includes at least one heating element, as well as at least two temperature sensors that are situated for example on the measurement surface of the sensor chip. From an asymmetry of the temperature profile acquired by the temperature sensors, which is influenced by the flow of the fluid medium, a mass flow and/or volume flow of the fluid medium can be inferred. Hot-film air mass sensors are standardly realized as plug-in sensors that is insertable fixedly or exchangeably into a flow tube. For example, this flow tube can be an intake tract of an internal combustion engine.

Here, a partial flow of the medium flows through at least one main channel provided in the hot-film air mass sensor. A bypass channel is formed between the inlet and the outlet of the main channel. In particular, the bypass channel is fashioned in such a way that it has a curved segment in order to divert the partial flow of the medium entering through the inlet of the main channel, the curved segment then going over into a segment in which the sensor chip is situated. This latter segment is the actual measurement channel in which the sensor chip is situated. In the bypass channel, an arrangement is provided that conducts the flow and that counteracts a separation of the flow of the medium partial stream from the walls of the measurement channel. In addition, in the area of its opening, which is oriented opposite the main direction of flow, the inlet region of the main channel is provided with oblique or curved surfaces that are made such that medium flowing into the inlet region is diverted away from the part of the main channel that leads to the sensor chip. This has the effect that liquid or solid body particles contained in the medium do not reach the sensor chip due to their inertia, so that they cannot contaminate it.

In normal operation, air from the plug-in sensor inlet travels to the sensor bearer via centrifugal force diversion. Due to the centrifugal force diversion, only the lighter particles, such as water and oil droplets, as well as dust and soot particles, move into the bypass channel. Due to their mass inertia, heavy particles leave the plug-in sensor with the majority of the mass flow through the main flow channel, or impact against the surrounding walls. In the air mass sensors known in the existing art, thin wire bonds produce the electrically conductive connection of the bond pads on the electronics module to the individual pins of the conductor array. A contamination of the sensor chip, and in particular of the micromechanical sensor membrane, for example with adherent dust particles, causes a change in the thermal economy, and thus causes deviations from characteristic curves. Deposits on the sensor chip or sensor bearer upstream from the micromechanical sensor membrane can, moreover, cause a thickening of the flow boundary layer that is relevant to measurement. In this case as well, characteristic curve deviations may result. Therefore, prevention or reduction of contamination is a measure for achieving as little characteristic curve drift as possible over the useful life of the component.

Because the transition in the area of the sensor membrane is decisively determined both by the boundary layer flow on the CMF side of the sensor bearer and also, to a certain extent, by the flow more remote from the wall (in the sense of the flow-mechanical definition of a boundary layer) both on the CMF side and also on the side oriented away from the CMF, and moreover is determined by the slipstream flow of the sensor bearer, these flow areas must be as stable as possible topologically, or qualitatively and quantitatively. Here, a changed topology is understood as a change in the structure defining the flow, with distinguished points such as stagnation points, turbulence foci, lines of separation, etc. A quantitative change in the flow quantities, in particular the fluctuation of speed and pressure even without a change in the topology, should therefore also be avoided or reduced. The mass flow through the bypass channel is thus divided when passing the sensor bearer on the side oriented toward the CMF and the side oriented away from the CMF, as well as by the gap between the end face of the sensor bearer and the bypass channel wall. However, there are limits on the striving for a precise tailoring of the flow topology, as well as on the limitation of fluctuations, in particular of the measurement-relevant draw-in area upstream from the micromechanical sensor system. A reduction of contamination, in particular in the near region and in particular for the case of contamination with relatively light dust particles that follow the flow very well, would therefore be desirable. The contamination of the micromechanical sensor membrane, the sensor chip, and the sensor bearer is to a large degree a function of the geometrical and electrostatic conditions in this area.

In a conventional geometry realized as an example of a bypass channel cover for an air mass sensor, the bypass channel cover, device housing, electronics compartment cover, and sensor bearer are glued to one another. The flow-conducting channel system extends from the bypass channel inlet via a first flow path up to the bypass channel outlet. The micromechanical measurement element is situated in this path. Particles that are light enough can follow this path. Particles that are heavy enough leave the plug-in sensor at the rear side through the main flow channel outlet. Inter alia, the "large components"—bypass channel cover, device housing, and electronics compartment cover—form the near region of the micromechanical measurement element.

In particular in the area of the sensor bearer, a low-tolerance placement and gluing process with sealing of the bypass channel must be ensured. Otherwise, particles or droplets, evading the centrifugal force diversion, would also move out of the plug-in sensor external flow through untight glued connections into the bypass channel, which is under low static pressure in the region of the sensor bearer, and in this way would arrive at the micromechanical measurement element. Such a contamination can cause, inter alia, characteristic curve drift. Here, the component sequence of the placement and gluing process is standardly as follows. After the electronics module is placed into the electronics compartment of the sensor housing, when the bypass channel cover is put into place a glue groove is formed for the "tongue" or the "glue blade," i.e. a narrow, circumferential side wall of the electronics module cover. The electronics module cover is thus placed last on the sensor housing and bypass channel cover.

In another conventional geometry of the bypass channel cover and of the sensor bearer, the greater part of the mass flow entering into the plug-in sensor moves from the bypass channel inlet via the main flow channel outlet and out of the plug-in sensor. A small part of the mass flow moves, via the region of the centrifugal force diversion and the counter-contour having the tear-off edge, to the sensor bearer having the micromechanical measurement element. Finally, the bypass mass flow flows out of the plug-in sensor via the bypass channel outlet. In the region of the sensor bearer, there exists both a tongue and groove system for gluing together the bypass channel cover and the device housing, and also, on the rear side, a tongue and groove system for gluing together the electronics module cover and the bypass channel cover. The filling of the grooves in the device housing can take place with glue on the so-called glue blade of the electronics module cover.

Characteristic for the branching of the mass flow is the stagnation point on the wall opposite the centrifugal force diversion. Dust particles can travel with the bypass channel mass flow to the micromechanical sensor membrane. In the near region of the sensor bearer, there exists a jet-type region having high speed. However, light particles can reach the overall sensor bearer or bypass channel width via recirculation areas. Therefore, contamination of the micromechanical measurement element is possible in the entire mass flow region.

In the near region of the micromechanical measurement element, according to current knowledge the formation of electrical fields is particularly significant for the deposition of particles on the micromechanical sensor membrane and on the sensor chip. The potentials prevailing there can be formulated qualitatively as negative or positive potentials. An electrostatic charging and the reaching of such potentials can arise for example through friction or charged particles directly on the depicted components, or indirectly via the field effect of surrounding components, such as a flow tube or air filter walls.

Charged particles are attracted in electrical fields by opposite charges or potentials, and are repelled by similar charges or potentials. Particles released in an electrical field without an initial speed move along the path of the strongest gradients. Thus, in a specific flow space, taking into account the additionally present inertial forces in the vicinity of the sensor bearer, a positively charged particle will move along the strongest gradient of the electrical field to the negative potential, i.e., to the sensor chip and the micromechanical sensor membrane. In this way, dust particles can in particular deposit on the sensor chip and on the micromechanical sensor membrane, and can cause, inter alia, a characteristic curve drift. Due to the specific geometrical bypass design, only a very small portion of the totality of particles is involved in the possible contamination. However, over the lifespan of the components, these adhesions of particles, caused for example electrostatically, accumulate and cause the described characteristic curve deviation.

SUMMARY

Therefore, in accordance with an example embodiment of the present invention, a sensor is provided for determining at least one parameter of a fluid medium flowing through a measurement channel that can at least to a large extent avoid the disadvantages of conventional sensors, and that in particular enables a reduction or prevention of dust contamination of the micromechanical sensor membrane, the sensor chip, and the sensor bearer, and thus enables a reduction of characteristic curve drifts, in particular over the useful life of the components, due in particular to a depositing of dust particles on the surface of the named components, and that permits an improved electromagnetic compatibility, i.e., reduced sensitivity of the electrical and electronic signal processing to radiated-in electromagnetic disturbances, and permits improved protection against electrostatic discharges into the circuit through controlled dissipation of the charge.

The sensor for determining at least one parameter of a fluid medium flowing through a measurement channel, in particular of an intake air mass flow of an internal combustion engine, has a sensor housing, in particular a plug-in sensor that is inserted or is insertable into a flow tube, in which sensor the measurement channel is formed, and at least one sensor chip situated in the measurement channel for determining the parameter of the fluid medium. The sensor housing has an electronics compartment for accommodating an electronics module and an electronics compartment cover for sealing the electronics compartment. The electronics compartment cover has, at least in part, electrically conductive properties.

In the context of the present invention, "electrically conductive properties of the electronics compartment cover" is to be understood as meaning that the electronics compartment cover is fashioned in order to conduct electrical charges. This can be realized in that on or in the electronics compartment cover there are situated electrically conductive components, such as electrical lines. Preferably, the electrical conductivity is realized through the material of the electronics compartment cover. For example, the electronics compartment cover is made at least partly of at least one electrically conductive material. This means that the electronics compartment cover can be made of a single material or of a plurality of materials that may be different. For example, the electronics compartment cover is made of metal. Alternatively, various materials are possible for the electronics compartment cover. For example, the electronics compartment cover can be made of one-component materials or two-component materials. In this way, the electronics compartment cover can be produced by an injection molding method. The injection molding method can be designed such that different materials or components, i.e., for example conductive and non-conductive components, can be present in different areas of the electronics compartment cover. In particular, fiber-matrix composites, ball-matrix composites, or other fiber composite materials can be injected in a one-component or two-component method. The conductivity of the electronics compartment cover can be realized adequately for example using a plastic injection molding method in which 15% carbon fiber portions are used.

The electronics compartment cover can be electrically connected to a fixed potential. The fixed potential is preferably the sensor ground. The sensor housing can have a measurement channel cover. In a closed state, the electronics compartment cover can be attached partly on the measurement channel cover. The sensor housing can have a housing body. The housing body can have at least one housing body bore. The measurement channel cover can have at least one measurement channel cover bore. The electronics compartment cover can have at least one peg. In a closed state, the peg can engage in the measurement channel cover bore and in the housing body bore. In a preferred specific embodiment, the electronics compartment cover can be electrically connected to the fixed electrical potential by the peg. Alternatively, the electronics module can have a circuit board. The circuit board can have at least one stud. The electronics compartment cover can be electrically connected to the fixed electrical potential by the stud. Alternatively, the circuit board can have a pin. The electronics compartment cover can be electrically connected to the fixed electrical potential by the pin. The electronics compartment cover can be fashioned such that in a closed state the electronics compartment cover covers the sensor chip. In other words, in a closed state the electronics compartment cover and the sensor chip overlap, when viewed perpendicular to the electronics compartment cover or to the sensor chip.

In the context of the present invention, the main direction of flow is to be understood as the local direction of flow of the fluid medium at the location of the sensor or of the sensor system; for example local irregularities such as turbulences can be disregarded. In particular, the main direction of flow can thus be understood as the locally averaged direction of transport of the flowing fluid medium. The main direction of flow can therefore be related on the one hand to the direction of flow at the location of the sensor system itself, or also to the flow direction in the channel inside the sensor housing, such as for example at the location of the sensor bearer or of the sensor chip, and the two named main directions of flow can differ. In the context of the present invention, it is therefore always indicated to which location the main direction of flow relates. If no more specific indication is given, the main direction of flow relates to the location of the sensor system.

In the context of the present invention, a downstream situation is to be understood as the situation of a component at a location that the fluid medium, flowing in the main direction of flow, reaches at a later time than it reaches a reference point.

Analogously, in the context of the present invention an upstream situation of a component is to be understood as a situation of the component at a location that the fluid medium, flowing in the main direction of flow, reaches at an earlier time than it reaches a reference point.

In the context of the present invention, the sensor bearer can be fashioned entirely or in part as a circuit bearer, in particular as a circuit board, or as a part of a circuit bearer, in particular of a circuit board. For example, the circuit bearer, in particular the circuit board, can have a prolongation that forms the sensor bearer and that extends into the channel, for example the measurement channel of a hot-film air mass sensor. The remaining part of the circuit bearer, in particular of the circuit board, can be housed for example in an electronics compartment, or in a housing of the sensor system or of a plug-in sensor of the sensor system.

In the context of the present invention, in general a circuit board is to be understood as a generally flat element that can also be used as the bearer of electronic structures such as conductors, terminal contacts, or the like, and preferably also has one or more such structures. Generally, at least slight deviations from the flat shape are also possible, and are to be understood as included herein. The circuit board can for example be made of a plastic material and/or a ceramic material, for example an epoxy resin, in particular a fiber-reinforced epoxy resin. In particular, the circuit board can for example be fashioned as a circuit board having conductors, in particular printed conductors (printed circuit board, PCB).

In this way, the electronics module of the sensor system can be greatly simplified, and for example a base plate and a separate sensor bearer can be done without. The base plate and sensor bearer can be replaced by a single circuit board on which for example a control and evaluation circuit of the sensor system can be entirely or partly situated. This control and evaluation circuit of the sensor system is used to control the at least one sensor chip and/or to evaluate the signals generated by this sensor chip. In this way, by combining the named elements the manufacturing outlay of the sensor system can be significantly reduced, and the constructive space requirement for the electronics module can be greatly reduced.

The sensor system can in particular have at least one housing, the channel being formed in the housing. For example, the channel can include a main channel and a bypass channel or measurement channel, and the sensor bearer and the sensor chip can be situated for example in the bypass channel or measurement channel. In addition, the housing can have an electronics compartment separate from the bypass channel, the electronics module or the circuit board being accommodated essentially in the electronics compartment. The sensor bearer can then be fashioned as a prolongation of the circuit board that extends into the channel. This system is technically comparatively easy to realize, in contrast to the conventional electronics modules requiring a high outlay.

In particular, in the case in which a circuit board is used as a sensor bearer, but also in other cases, and/or using other media as sensor bearer, the sensor bearer can be fashioned at least partly as a multilayer sensor bearer. Thus, the sensor bearer can be fashioned in a so-called multilayer technique, and can have two or more bearer layers connected to one another. For example, these bearer layers can in turn be made of a metal, a plastic, or ceramic material, or a composite material, and can be connected to one another using bonding techniques such as gluing.

In this case, in which a multilayer technique is used having a plurality of sensor layers of the sensor bearer, the leading edge can be made in at least partly stepped fashion through a different dimensioning of the bearer layers opposite the main direction of flow of the fluid medium. In this way, the profiles can be realized at least approximately in stepped fashion. For example, in this way rectangularly shaped or—approximated by a stepped shape—at least approximately round, rounded-off, or wedge-shaped profiles can be fashioned in a sectional plane perpendicular to the plane of extension of the sensor bearer. The sensor chip can be situated on or in the sensor bearer in such a way that this chip is oriented perpendicular to the local main direction of flow. For example, the sensor chip can be made rectangular, one side of this rectangle being configured perpendicular or substantially perpendicular to the local main direction of flow, for example with an orientation that deviates from the perpendicular by not more than 10 degrees.

The sensor chip can be electrically contacted via at least one electrical connection. For example, the sensor bearer, in particular a circuit board forming the sensor bearer or a prolongation of this circuit board, can have one or more conductors and/or contact pads that are connected to corresponding contacts on the sensor chip, for example by a bonding method. In this case, the electrical connection can be protected and separated from the fluid medium by at least one cover. This cover can be fashioned in particular as a so-called glob top, for example as plastic drops and/or glue drops that cover the electrical connection, for example the bonding wires. In this way, in particular influences on the flow due to the electrical connection can also be reduced, because the glob top has a smooth surface.

In addition, the sensor chip can have at least one sensor region. This sensor region can, for example, be a sensor surface made for example of a porous ceramic material and/or in particular can be a sensor membrane. The flowing fluid medium can flow over the sensor membrane as measurement surface or sensor region. The sensor chip includes, for example, at least one heating element and at least two temperature sensors that are situated for example on the measurement surface of the sensor chip, one temperature sensor being positioned upstream from the heating element and the other temperature sensor being positioned downstream from the heating element. From an asymmetry of the temperature profile acquired by the temperature sensors, which profile is influenced by the flow of the fluid medium, a mass flow and/or volume flow of the fluid medium can be inferred.

In the context of the present invention, a leading edge of the sensor bearer is to be understood as that segment of the sensor bearer that is situated upstream from the sensor chip.

In accordance with the present invention, an electrically conductive electronics compartment cover may be provided. This significantly reduces a dust contamination of the micromechanical sensor membrane, the sensor chip, and the sensor bearer. In particular, characteristic curve drifts of the sensor over its lifetime can in this way be reduced or prevented. In addition, a basic idea of the present invention is the forming of a shielded space between the base plate of the electronics module and the electronics compartment cover, whereby the circuit boards situated inside this shielded space, having the evaluation circuit, are better protected against influence from the outside due to radiation, and the resulting resistance to disturbance can be increased. In addition, in this way an alternative ground potential can be realized outside or above the circuit or the sensor chip, which, in the case of electrostatic discharges with connected cables, has the result that the discharges, when the sparkover voltage is exceeded, do not take place into the circuit in an undefined fashion; rather, the currents are carried off directly to the ground potential of the sensor, and in this way the circuit is circumvented. In addition, due to the geometrical possibilities of realization, the choice of material for the electronics compartment cover, and the type of contacting, the sensor can be produced at low cost with a low production-related outlay.

BRIEF DESCRIPTION OF THE DRAWINGS

Further optional details and features of the present invention result from the following description of preferred exemplary embodiments shown schematically in the Figures.

DETAILED DESCRIPTION OF EXAMPLE EMBODIMENTS OF THE PRESENT INVENTION

Figure 1:
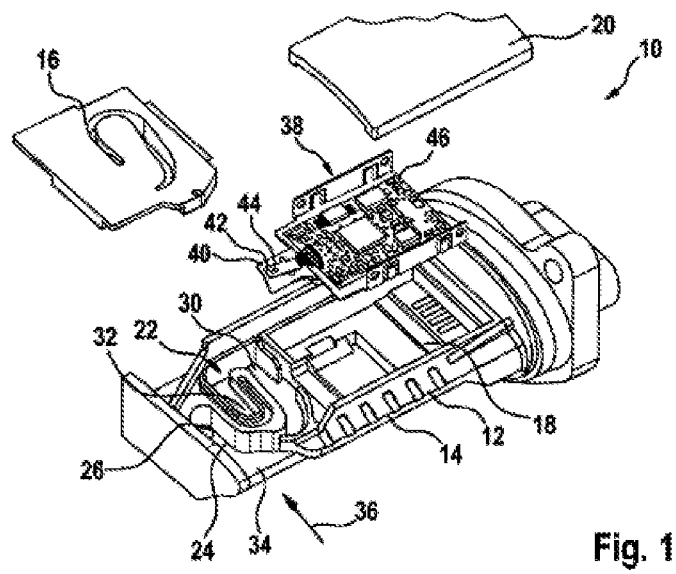
FIG. 1 shows a perspective view of a sensor.

FIG. 1 shows a perspective view of a sensor system 10 for determining a parameter of the fluid medium. Sensor system 10 is fashioned as a hot-film air mass sensor and includes a sensor housing 12 fashioned as a plug-in sensor, which can be plugged for example into a flow tube, in particular an intake tract of an internal combustion engine. Sensor housing 12 has a housing body 14, a measurement channel cover 16, an electronics compartment 18, and an electronics compartment cover 24 sealing electronics compartment 18. A channel structure 22 is fashioned in housing body 16. Channel structure 22 has a main channel 24 that opens into a main flow outlet 26 on lower side 30, relative to the representation shown in FIG. 1 of sensor housing 12, as well as a bypass or measurement channel 30 branching off from main channel 24, which bypass channel opens into a bypass or measurement channel outlet 32, also situated on lower side 30 of sensor housing 12. A representative quantity of the fluid medium can flow through channel structure 22 via an inlet opening 34 that, during use, is oriented opposite a main direction of flow 36 of the fluid medium at the location of sensor housing 12.

Figure 2:
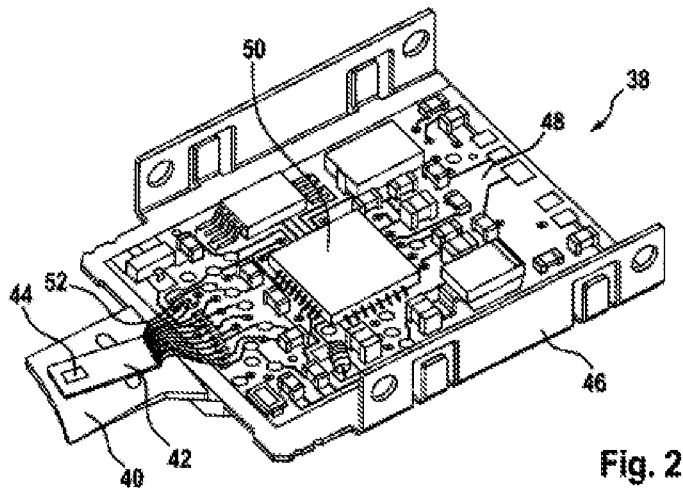
FIG. 2 shows an enlarged view of an electronics module of the sensor.

FIG. 2 shows an enlarged representation of an electronics module 38 of sensor system 10. During use of electronics module 38, a sensor bearer 40 extends into measurement channel 30. In this sensor bearer 40, a sensor chip 42 is embedded in such a way that the fluid medium can flow over a micromechanical sensor membrane 44 fashioned as sensor area of sensor chip 42. Sensor bearer 40 is, with sensor chip 42, a component of electronics module 38. Electronics module 38 additionally has a curved base plate 46 as well as a circuit board 48 attached thereon, for example glued thereon, having a control and evaluation circuit 50. Sensor chip 42 is electrically connected to control and evaluation circuit 50 via electrical connections 52, here realized as wire bonding. The electronics module 38 resulting in this way is housed in, for example glued into, electronics compartment 18 in housing body 14 of sensor housing 12. Here, sensor bearer 40 extends into channel structure 22. Subsequently, electronics compartment 18 is closed by electronics compartment cover 20.

Figure 3:
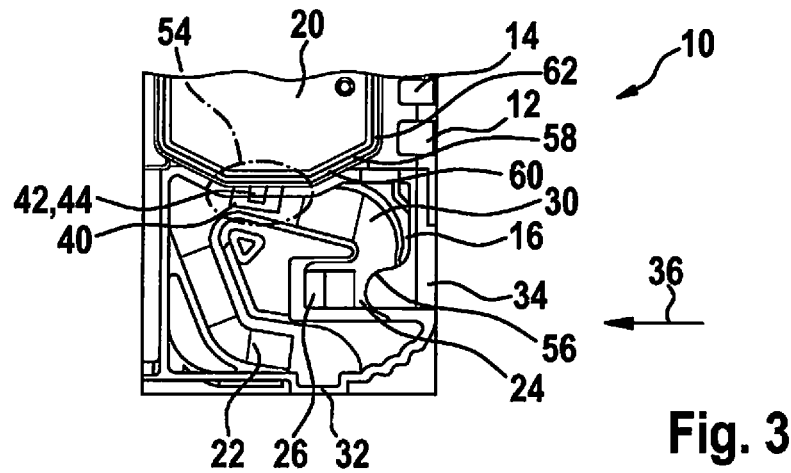
FIG. 3 shows a top view of a further possible specific embodiment of the sensor.

FIG. 3 shows a top view of a further possible specific embodiment of sensor 10. Here, channel structure 22 is fashioned in measurement channel cover 16. Measurement channel outlet 32 is fashioned in an end face of measurement channel cover 16. Measurement channel cover 16, housing body 14, electronics compartment cover 20, and sensor bearer 40 are glued to one another. Measurement channel cover 16, housing body 14, and electronics compartment cover 20 define a near region 54 of sensor chip 42. In particular in the area of sensor bearer 40, a low-tolerance placement and gluing process with sealing of measurement channel 30 must be ensured. Otherwise, particles or droplets, circumventing a centrifugal force diversion 56, would also move out of the flow surrounding sensor housing 12 through untight glue bonds in measurement channel 30, which is under low static pressure, in the region of sensor bearer 40, and in this way would reach sensor chip 42. Such a contamination can cause characteristic curve drifts. Moreover, leakages—flow paths from the outside to the inside—can, even without additional contamination, cause changes in the pressure and speed fields in the region of sensor chip 42, and thus, inter alia, can cause characteristic curve drifts. For this reason, a tongue and groove system 58 is provided for the glued bonding of the components measurement channel cover 16, housing body 14, and electronics compartment cover 20, as is described in more detail below. Tongue and groove system 58 includes a glue groove 60 and on housing body 14 and at least one tongue 62, or a narrow circumferential side wall on electronics compartment cover 20, which engages in glue groove 60. The component sequence of the placement and gluing process is as follows: after placing electronics module 38 into housing body 14, or electronics compartment 18, with the placement of measurement channel cover 16 glue groove 60 is formed for tongue 62, or the narrow circumferential side wall of electronics compartment cover 20. Electronics compartment cover 20 is thus placed last onto housing body 14 and measurement channel cover 16.

Figure 4:
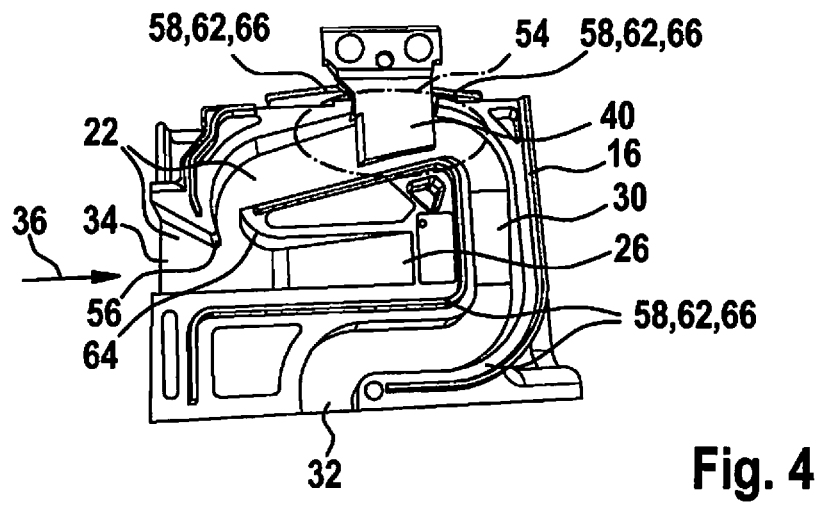
FIG. 4 shows a top view of the measurement channel cover.

FIG. 4 shows a top view of measurement channel cover 16. In the geometry shown in FIG. 4, the larger part of the mass flow entering into sensor housing 12 from inlet opening 34 flows out from sensor housing 12 via the main flow outlet. A small part of the mass flow moves over the region of centrifugal force diversion 56 and a counter-contour 63 having tear-off edge 64, to sensor bearer 40 having sensor chip 42. Finally, the mass flow from measurement channel 30 exits sensor housing 12 via measurement channel outlet 32. In addition, in FIG. 4 a plurality of tongues 62 can be seen that can also be fashioned as glue blades 66, or can be designated as such. Tongues 62, or glue blades 66 of tongue and groove system 58, are used for the glue bonding of housing body 14, of measurement channel cover 16, and electronics compartment 20, and extend along channel structure 22. In the area of sensor bearer 40, there thus exists both a tongue and groove system 58 for gluing together measurement channel cover 16 and housing body 14, and, on the rear side, a tongue and groove system 58 for gluing together electronics compartment cover 20 and measurement channel cover 16 (FIG. 3).

Figure 5:
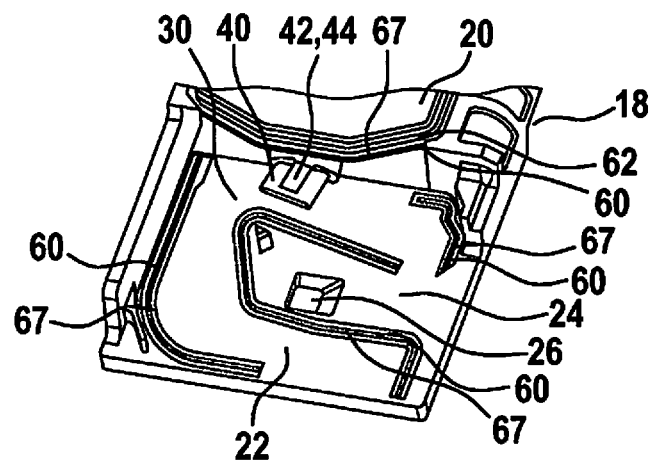
FIG. 5 shows an enlarged view of the housing body in the area of the measurement channel cover, with mounted electronics compartment cover, as well as sensor bearer with micromechanical sensor chip.

FIG. 5 shows an enlarged view of housing body 14 in the region of measurement channel cover 16 with mounted electronics compartment cover 20, and sensor bearer 40 with micromechanical sensor chip 42. Visible are glue grooves 16 in housing body 14 and glue 67 on glue blade 66 of electronics compartment cover 20. Visible in particular is the filling of glue grooves 60 with glue 67, which grooves extend along the edges of channel structure 22 and of electronics compartment cover 20.

Figure 6:
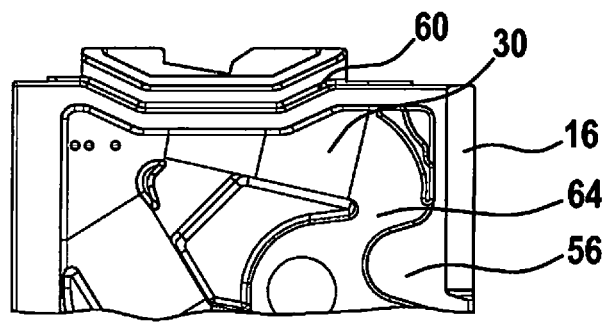
FIG. 6 shows an enlarged view of a rear side of the measurement channel cover.

FIG. 6 shows an enlarged view of a rear side of measurement channel cover 16. Visible is a glue groove 60 in measurement channel cover 16. In this region, for particular variants of the present invention described in more detail below, changes must be carried out for the advantages or improvement effects discussed below to be realized.

Figure 7:
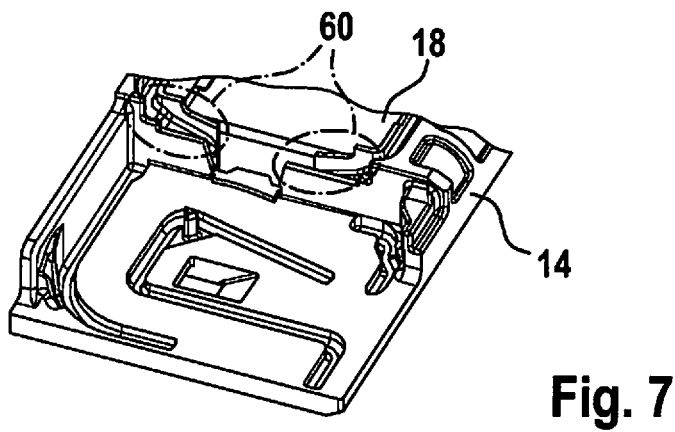
FIG. 7 shows an enlarged perspective view of the housing body.

FIG. 7 shows an enlarged perspective view of housing body 14 in an unclosed state, i.e., without measurement channel cover 16. Correspondingly, neither measurement channel cover 16, in which channel structure 22 is formed, nor electronics module 38 and electronics compartment 18 is provided. Visible are glue grooves 60 in housing body 14, which are used for the fastening of electronics compartment cover 20 and are situated on a wall region having an opening through which, in the mounted state, the sensor bearer extends out from electronics compartment 18 and into measurement channel 30.

Figure 8:
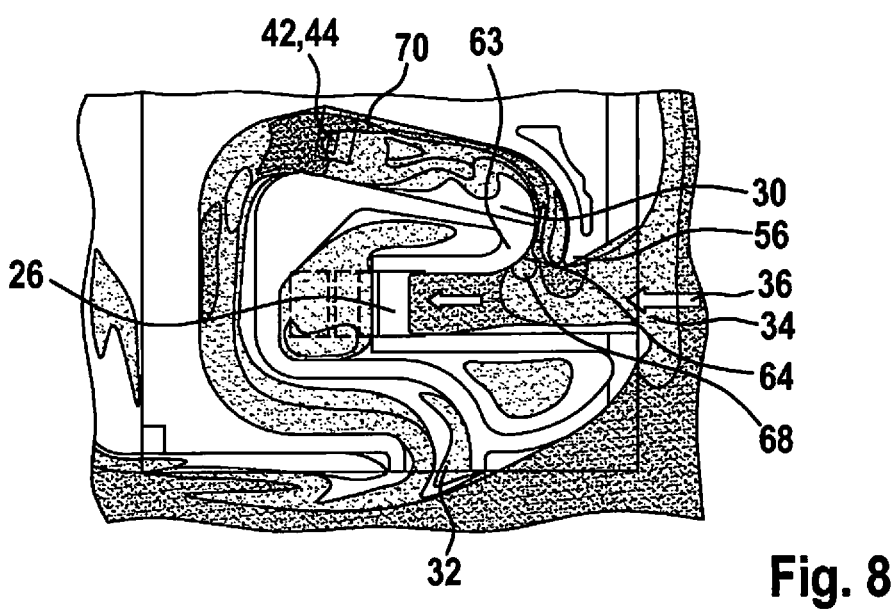
FIG. 8 shows a representation of possible flow conditions in the channel structure.

FIG. 8 shows a representation of possible flow conditions in channel structure 22 of measurement channel cover 16. Clearly visible is the division of the overall mass flow at inlet opening 34 into the mass flow through main channel 24 and the mass flow through measurement channel 30. Characteristic for the branching is a stagnation point 68 on counter-contour 63 with tear-off edge 64 opposite centrifugal force diversion 56. Dust particles can move with the mass flow through measurement channel 30 to micromechanical sensor membrane 44. In the near region of sensor bearer 40, there results a jet-shaped region 70 having high speed. Light particles can however reach the overall width of sensor bearer 40 or of measurement channel 30 via recirculation areas. Therefore, a contamination of micromechanical sensor membrane 44 is possible.

Figure 9:
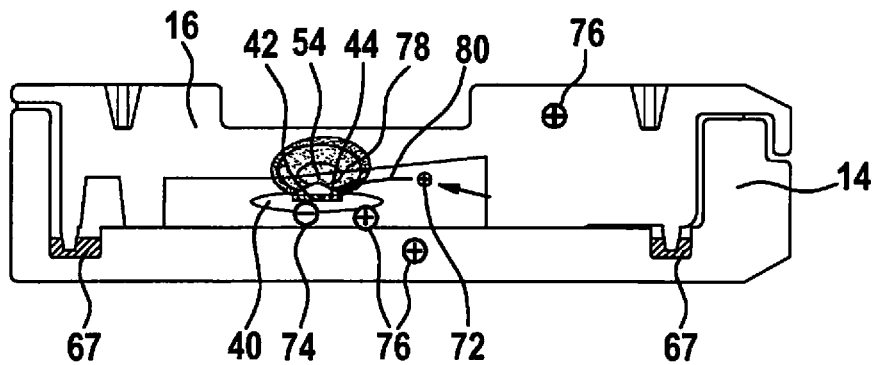
FIG. 9 shows a distribution of electrical potentials of the sensor.

FIG. 9 shows a distribution of electrical potentials in sensor 10. The section runs through measurement channel 30 in the region of sensor bearer 40. As possible boundary conditions, a potential of 0 V at the chip surface and 100 V at other components was set. In near region 54 of micromechanical sensor membrane 44, the formation of electrical fields is important in particular for the deposition of particles on micromechanical sensor membrane 44 and sensor chip 42. These potentials can be qualitatively formulated, for the statements below, as negative or positive potentials. An electrostatic charging and reaching of such potentials can for example arise through friction or charged particles directly on the depicted components, or indirectly via the field effect of surrounding components, such as flow tube, air filter walls, and the like.

Charged particles are attracted in electrical fields by opposite charges or potentials, and/or repelled by equal charges or potentials. Particles released in an electrical field without an initial velocity move along the path of the strongest gradients.

As shown in FIG. 9, a positively charged particle 72 will therefore move in the flow space, taking into account the additionally present inertial forces in the vicinity of sensor bearer 40, along the strongest gradient of the electrical field, to a negative potential 74, and thus to sensor chip 42 and micromechanical sensor membrane 44. In this way, dust particles can deposit in particular on sensor chip 42 and on micromechanical sensor membrane 44, and can cause, inter alia, characteristic curve drift. In addition, it can be seen that the remaining area of housing body 14 and of measurement channel cover 16 has a positive potential 76. Therefore, in the vicinity of sensor bearer 40, or of sensor chip 42, there results an electrical field 78.

Figure 10:
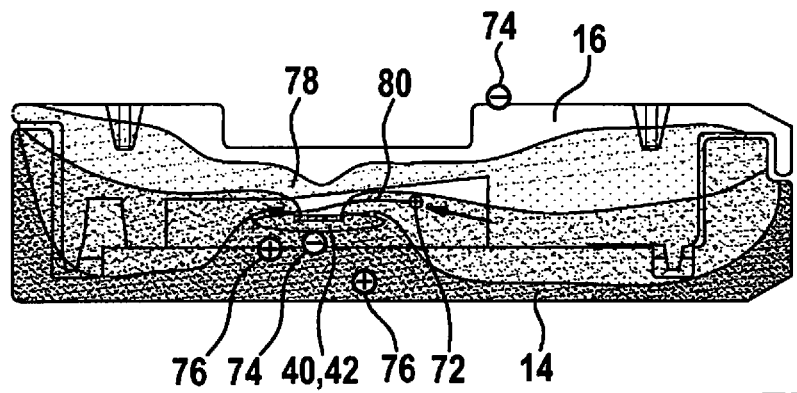
FIG. 10 shows a distribution of electrical potentials of the sensor.

FIG. 10 shows a distribution of electrical potentials in an electrically conductive measurement channel cover 16. Visible are positive potential 76 of housing body 14 and negative potential 74 in the region of sensor chip 42. It is correspondingly possible to set measurement channel cover 16 electrically to a negative potential 74, such as the ground potential of sensor 10. As can be seen from the representation of FIG. 10, the gradients of electrical fields 78 are significantly less pronounced than in the representation of FIG. 9. The depicted example of a trajectory 80 of positively charged particle 72 is intended to yield a lower degree of contamination. However, electromagnetic compatibility relative to the electronic components of sensor 10, given an electrically conductive measurement channel cover 16, is not present in every case.

Figure 11:
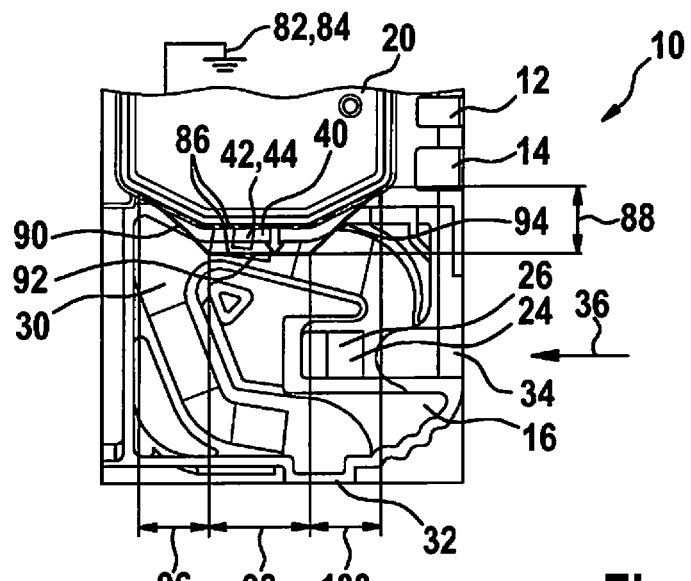
FIG. 11 shows a perspective view of a sensor according to a first specific embodiment of the present invention.

FIG. 11 shows a perspective view of a sensor 10 according to a first specific embodiment of the present invention that overcomes the disadvantages named above. Thus, electronics compartment cover 20 has electrically conductive properties. For example, electronics compartment cover 20 is made of an electrically conductive material. For example, electronics compartment cover 20 is made of metal. Alternatively, various materials are possible for electronics compartment cover 20. For example, electronics compartment cover 20 can be made of one-component materials or two-component materials. In this way, electronics compartment cover 20 can be produced using an injection molding method. The injection molding method here can be realized in such a way that in different regions of electronics compartment cover 20 different materials or components can be present, i.e., for example conductive and non-conductive components. In particular, fiber-matrix composites, ball-matrix composites, or other fiber composite materials can be injected in a one-component or two-component method. The conductivity of electronics compartment cover 20 can be realized adequately for example by a plastic injection molding method in which 15% carbon fiber portions are used.

Figure 12:
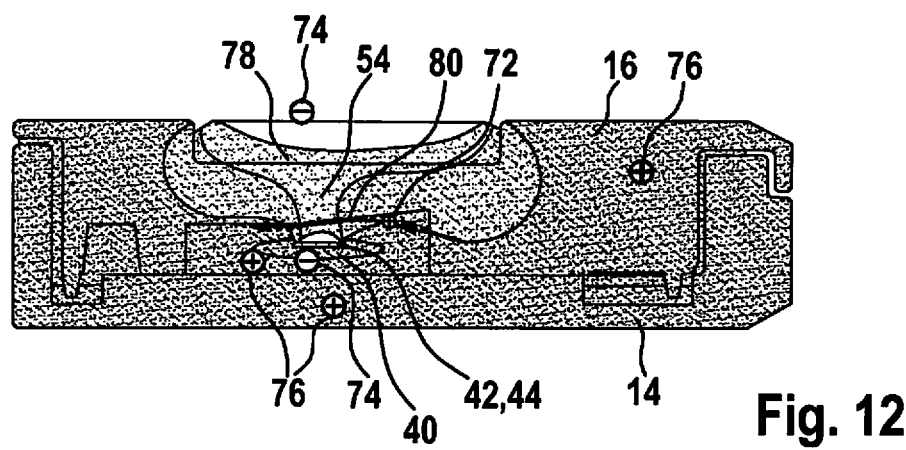
FIG. 12 shows a representation of the distribution of electrical potentials.

FIG. 12 shows the distribution of electrical potentials in sensor 10 according to the present invention. A positively charged particle 72 and its trajectory 80 are visible. In the depicted specific embodiment, electronics compartment cover 20 is electrically connected to a fixed potential 82 (FIG. 11). Preferably, fixed potential 82 is sensor ground 84. Electronics compartment cover 20 has a negative potential 74 and is therefore negatively charged. In near region 54 of sensor chip 42 and of micromechanical sensor membrane 44 there thus result significantly weaker gradients of electrical field 78. A positively charged dust particle 72, for example, is much less strongly attracted in near region 54 of sensor chip 42. Thus, it cannot deposit on sensor chip 42 or on micromechanical sensor membrane 44. Negatively charged particles, not shown in more detail here, are attracted on the one hand by positively charged housing body 14 and are therefore harmless with regard to contamination-induced characteristic curve drifts. On the other hand, there is the possibility that negatively charged particles will deposit on a positively charged sensor bearer 40. However, the contamination of sensor bearer 40 becomes relevant to characteristic curves only when considerable particle layer thicknesses form, above all upstream from sensor chip 42 and from micromechanical sensor membrane 44, and significantly change the flow and temperature boundary layer in near region 54 of micromechanical sensor membrane 44. However, the relatively thin boundary layer and the high flow speeds at sensor bearer 40 counteract the formation of such a thick particle layer.

Returning to FIG. 11, a possible modification of sensor 10 according to the present invention is described. In addition, an edge 86 of electronics compartment cover 20 can be seen in FIG. 11. Edge 86 is oriented towards measurement channel cover 16. Edge 86 can extend up to approximately the center of sensor chip 42. However, a specific embodiment is possible in which edge 86 is drawn further in the direction of channel structure 22, so that in a closed state electronics compartment cover 20 completely covers sensor chip 42. The drawing forward of edge 86 in the form of a dimensioning 88 is shown in FIG. 11. Further possible modifications result to a plurality of segments 90, 92, 94 of edge 86, with associated dimensionings 96, 98, 100. In other words, in each case the width of segments 90, 92, 94 of edge 86 can be modified as a function of the respective application or position of sensor bearer 40 or sensor chip 42, in order to realize a covering of sensor chip 42 by electronics compartment cover 20.

Figure 13:
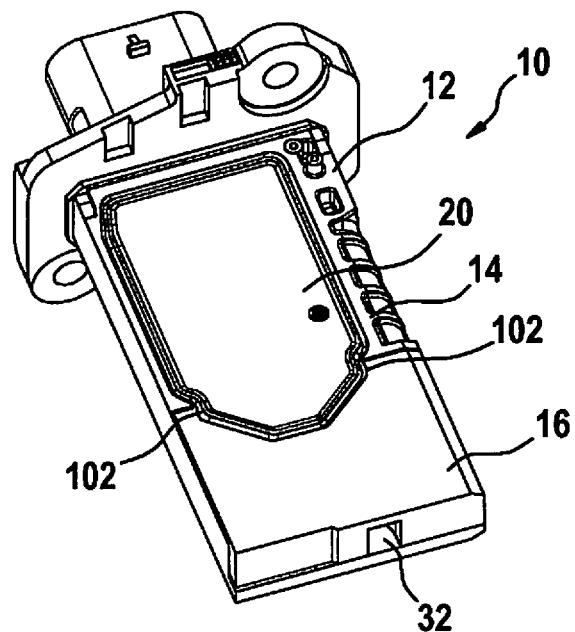
FIG. 13 shows a perspective view of a sensor according to a second specific embodiment of the present invention.

FIG. 13 shows a perspective view of a sensor 10 according to a second specific embodiment of the present invention. In the following, only the differences from the first specific embodiment are described, and identical components are provided with identical reference characters. In sensor 10 of the second specific embodiment, electronics compartment cover 20 has, adjacent to the edge 86, in each case an additional straight wall segment 102. Wall segments 102 can extend parallel to a longitudinal direction of extension of sensor housing 12.

Figure 14:
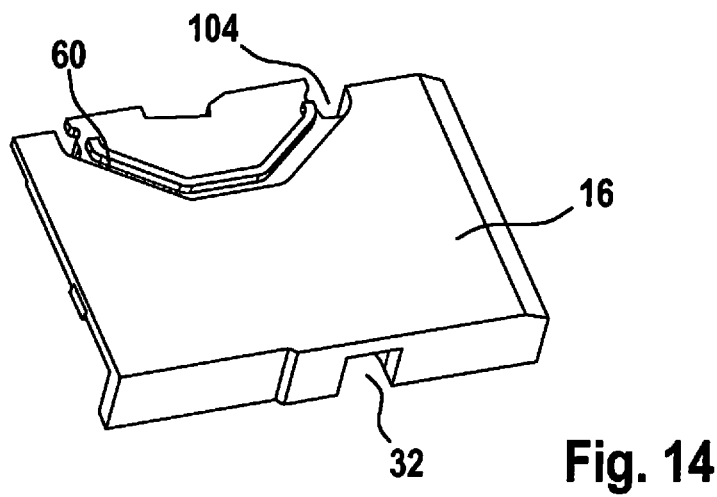
FIG. 14 shows a perspective view of the measurement channel cover of the second specific embodiment.

FIG. 14 shows a perspective view of measurement channel cover 16 of the second specific embodiment. Visible is a curve of glue groove 60, differing from the conventional sensor, and adapted to the curve of edge 86. Edge 86 has glue blade 66. In addition, measurement channel cover 16 has a measurement channel cover bore 104. Not shown in more detail is the fact that housing body 14 has a housing body bore.

Figure 15:
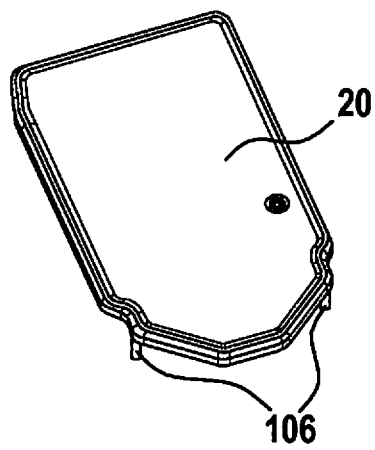
FIG. 15 shows a top view of an electronics compartment cover of the second specific embodiment.

FIG. 15 shows a top view of electronics compartment cover 20 of the second specific embodiment. Electronics compartment cover 20 has at least one peg 106. Peg 106 is for example soldered onto electronics compartment cover 20 or, given a realization in plastic, is injected on. In a closed state, peg 106 engages in measurement channel cover bore 104 and in the housing cover bore.

Figure 16:
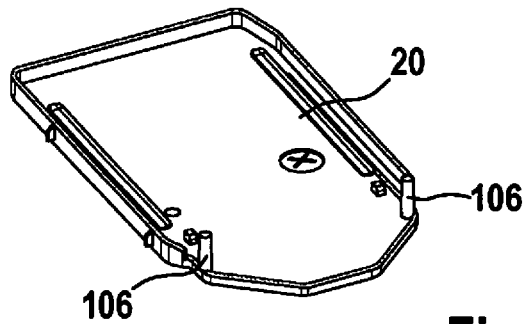
FIG. 16 shows a view from below of the electronics compartment cover of the second specific embodiment.

FIG. 16 shows a view from below of electronics compartment cover 20 of the second specific embodiment. It can be seen that it is also possible to provide more than one peg 106. For example, two pegs 106 are provided that stand out perpendicularly from electronics compartment cover 20 and that, in a closed state, each engage in a measurement channel cover bore 104 and housing body bore. In a preferred specific embodiment, electronics compartment cover 20 is electrically connected to fixed electrical potential 82 by peg 106.

Figure 17:
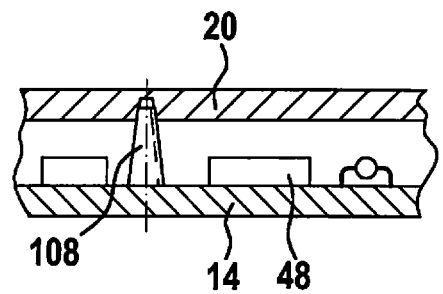
FIG. 17 shows a cross-sectional view of a sensor according to a third specific embodiment.

FIG. 17 shows a cross-sectional view of a sensor 10 according to a third specific embodiment of the present invention. In the following, only the differences from the preceding specific embodiment are described, and identical components are provided with identical reference characters. The third specific embodiment has an approximately inverse design relative to second specific embodiment. Thus, circuit board 48 has a stud 108. Stud 108 can be fixedly connected to circuit board 48. For example, stud 108 is soldered onto circuit board 48. This realization allows the use of conventional circuit boards that can be modified correspondingly through the provision of stud 108. Electronics compartment cover 20 of the third specific embodiment has a conical counter-contour 110.

Figure 18:
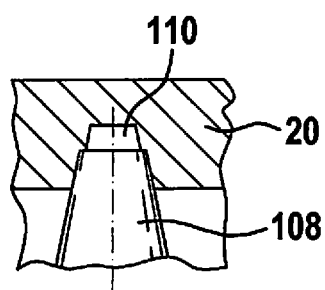
FIG. 18 shows an enlarged segment of the sensor of the third specific embodiment.

FIG. 18 shows an enlarged segment of sensor 10 of the third specific embodiment. Visible are stud 108 and electronics compartment cover 20 with conical counter-contour 110. In a closed state, stud 108 engages in conical counter-contour 110, so that electronics compartment cover 20 is electrically connected to fixed electrical potential 82 by stud 108.

Figure 19:
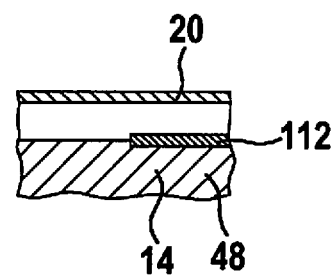
FIG. 19 shows a segment of a sensor according to a fourth specific embodiment.

FIG. 19 shows a segment of a sensor 10 according to a fourth specific embodiment of the present invention. In the following, only the differences from the preceding specific embodiments are described, and identical components are provided with identical reference characters. In the fourth specific embodiment, circuit board 48 has a pin 112. Pin 112 can for example be an additional conductor array pin. Pin 112 can be injected into housing body 14 and can extend parallel to circuit board 48. Electronics compartment cover 20 is electrically connected to fixed electrical potential 82 by pin 112.

Figure 20:
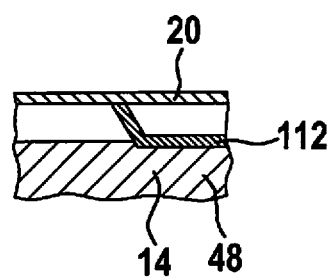
FIG. 20 shows a segment of a sensor according to a fifth specific embodiment.

FIG. 20 shows a segment of a sensor 10 according to a fifth specific embodiment of the present invention. In the following, only the differences from the preceding exemplary embodiments are described, and identical components are provided with identical reference characters. Sensor 10 of the fifth specific embodiment is based on sensor 10 of the fourth specific embodiment. In sensor 10 of the fifth specific embodiment, pin 112 is not situated parallel to circuit board 48, but rather is oriented in the direction towards electronics compartment cover 20, and is angled away from housing body 14.

Figure 21:
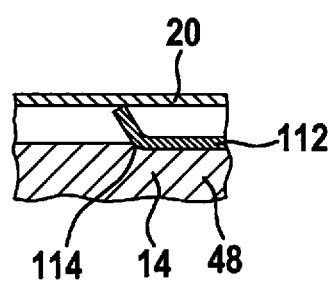
FIG. 21 shows a segment of a sensor going to a sixth specific embodiment.

FIG. 21 shows a segment of a sensor 10 according to a sixth specific embodiment of the present invention. In the following, only the differences from the preceding exemplary embodiments are described, and identical components are provided with identical reference characters. Sensor 10 of the sixth specific embodiment is based on sensor 10 of the fifth specific embodiment. Here, pin 112 is bent in the direction towards electronics compartment cover 20 with a radius 114. In addition, pin 112 is beveled, and forms with electronics compartment cover 20 a contacting standing under pre-tension.

Figure 22:
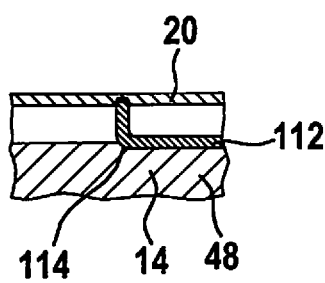
FIG. 22 shows a segment of a sensor according to a seventh specific embodiment.

FIG. 22 shows a segment of a sensor 10 according to a seventh specific embodiment of the present invention. In the following, only the differences from the preceding exemplary embodiments are described, and identical components are provided with identical reference characters. Sensor 10 of the seventh specific embodiment is based on sensor 10 of the sixth specific embodiment. Pin 112 is bent in the direction towards electronics compartment cover 20 at an angle of essentially 90°, i.e. with a deviation of not more than 10° from an ideal right angle.

Figure 23:
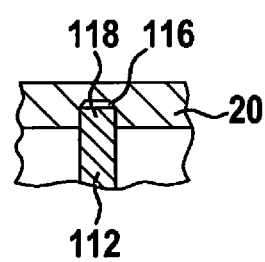
FIG. 23 shows an enlarged segment of the sensor of the seventh specific embodiment.

FIG. 23 shows an enlarged segment of sensor 10 of the seventh specific embodiment, as shown in FIG. 22. Electronics compartment cover 20 has a conical recess 116. Pin 112 engages in recess 116 and is connected to electronics compartment cover 20 in such a way that a swaged connection 118 is formed with electronics compartment cover 20.

Figure 24:
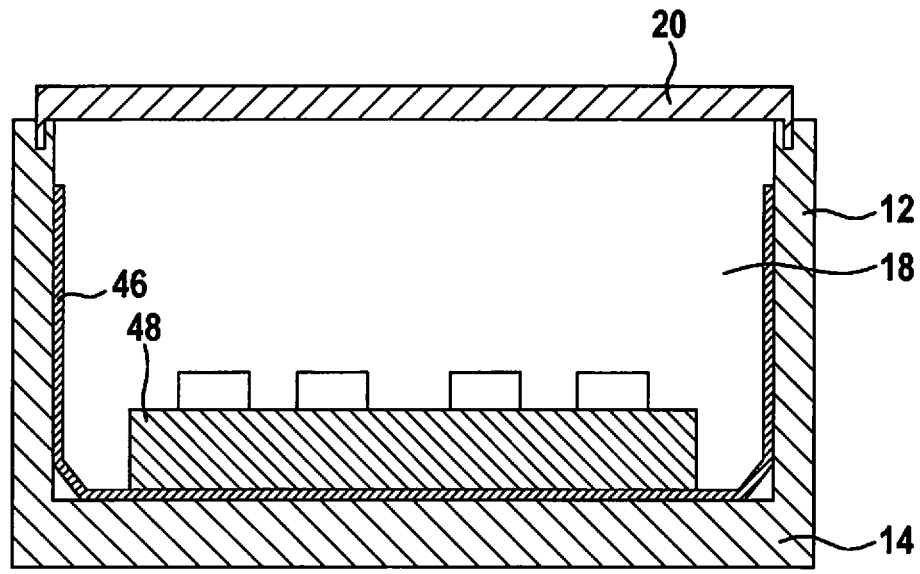
FIG. 24 shows a cross-sectional view of the sensor.

FIG. 24 shows a cross-sectional view of a sensor 10 according to one of the specific embodiments described above. The section runs through electronics compartment 18. Visible is circuit board 48 with control and/or evaluation circuit 50. Also visible is the way in which base plate 46 fits against housing body 14. Electronics compartment 18 is closed by electronics compartment cover 20. In this way, a shielded electronics compartment 18 is realized.

Figure 25:
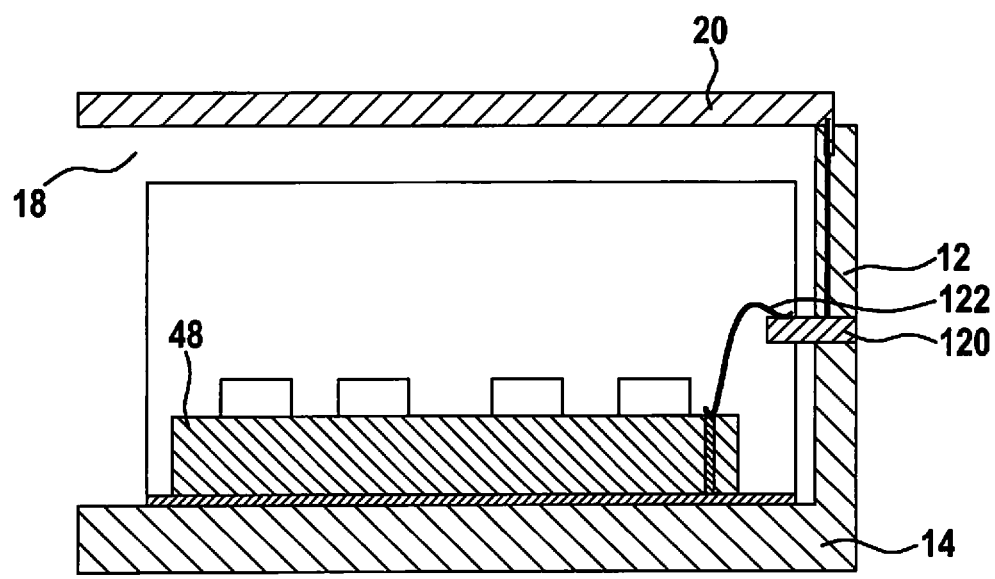
FIG. 25 shows a longitudinal sectional view of the sensor.

FIG. 25 shows a longitudinal sectional view of a sensor 10 according to one of the specific embodiments described above. The section runs through electronics compartment 18. Visible is circuit board 48 in electronics compartment 18 and the electrical contacting of circuit board 48 with a plug 120 of sensor housing 12 by bonding wires 122. Housing body 14, base plate 46, electronics compartment cover 20, circuit board 48 with its electronic components, plug 120, and the contacting of electronics compartment cover 20 form a shielded space that is advantageous with regard to electromagnetic compatibility and electrostatic discharges.

What is claimed is:

1. A sensor for determining at least one parameter of a fluid medium flowing through a measurement channel, the sensor comprising:
   a sensor housing for a plug-in sensor that is inserted into or is insertable into a flow tube, the sensor housing having a measurement channel fashioned therein; and
   at least one sensor chip situated in the measurement channel for determining the parameter of the fluid medium;
   wherein the sensor housing has an electronics compartment for accommodating an electronics module, and an electronics compartment cover for closing the electronics compartment, the electronics compartment cover having at least in part electrically conductive properties,
   wherein, in a closed state, the electronics compartment cover and the at least one sensor chip overlap when viewed in a perpendicular direction to the electronics compartment cover or to the at least one sensor chip,
   wherein the electronics compartment cover is fashioned such that in a closed state, the electronics compartment cover overlaps the sensor chip, wherein the electronics compartment cover does not cover the measurement channel,
   wherein the electronics module has a sensor bearer, in which the sensor chip is embedded, wherein the sensor bearer projects into the measurement channel
   wherein the electronics compartment cover has a projecting area with an edge projecting in a direction of a section of the sensor housing having the measurement channel,
   wherein, in the projecting area, the electronics compartment cover rests on a measurement channel cover, and viewed in a direction perpendicular to the electronics compartment cover, the measurement channel cover is located below the projecting area and above the sensor chip, so that the projecting area overlaps the sensor chip.

2. The sensor as recited in claim 1, wherein the at least one parameter is an intake air mass flow of an internal combustion engine.

3. The sensor as recited in claim 1, wherein the electronics compartment cover completely covers the sensor chip.

4. The sensor as recited in claim 1, wherein the sensor housing has a housing body, the housing body having at least one housing body bore, the measurement channel cover having at least one measurement channel cover bore, the electronics compartment cover having at least one peg, and in a closed state, the peg engages in the measurement channel cover bore and in the housing body bore.

5. The sensor as recited in claim 4, wherein the electronics compartment cover is electrically connected to the fixed electrical potential by the peg.

6. The sensor as recited in claim 1, wherein the electronics compartment cover is produced at least in part from at least one electrically conductive material.

7. The sensor as recited in claim 6, wherein the electronics compartment cover is electrically connected to a fixed potential.

8. The sensor as recited in claim 7, wherein the fixed potential is the sensor ground.

9. The sensor as recited in claim 7, wherein the sensor housing has a measurement channel cover, the electronics compartment cover, in a closed state, being attached partly on the measurement channel cover.

10. The sensor as recited in claim 7, wherein the electronics module has a circuit board, the circuit board having at least one stud, the electronics compartment cover being electrically connected to the fixed electrical potential by the stud.

11. The sensor as recited in claim 7, wherein the electronics module has a circuit board, the circuit board having at least one pin, the electronics compartment cover being electrically connected to the fixed electrical potential by the pin.

* * * * *